United States Patent Office 3,311,607
Patented Mar. 28, 1967

3,311,607
NEOMYCIN PAMOATE
Silvano Casadio, Milan, Italy, assignor to Istituto de Angeli S.p.A., Milan, Italy, an Italian body corporate
No Drawing. Filed Nov. 20, 1964, Ser. No. 412,832
Claims priority, application Great Britain, Dec. 23, 1963, 50,730/63
1 Claim. (Cl. 260—210)

This invention is concerned with a new chemical compound having antibacterial activity.

The antibiotic neomycin is well-known and the term "neomycin" is used herein in its commonly accepted signification as referring to an antibiotic consisting wholly or principally of neomycin B but which may also contain neomycin C and/or neomycin A. Neomycin A is believed to be an inactive degradation product of neomycin B while neomycin C is an isomer of neomycin B exhibiting, however, lower activity. Neomycin B is believed to have the empirical formula $C_{23}H_{46}N_6O_{13}$ and commonly constitutes about 90% of commercial neomycin. Neomycin is a useful antibiotic exhibiting a wide spectrum of antibacterial activity including activity against both gram-positive and gram-negative organisms; it is basic in character and is usually employed as the sulphate.

It is an object of the present invention to provide a new salt of neomycin which is especially suitable for use in the treatment of intestinal infections, and which has advantages for this purpose as compared with known acid addition salts such as neomycin sulphate.

According to the present invention therefore, we provide the compound neomycin pamoate.

The compound according to the invention is believed to contain three molecules of pamoic acid to one molecule of neomycin. Thus the compound may be represented by the formula

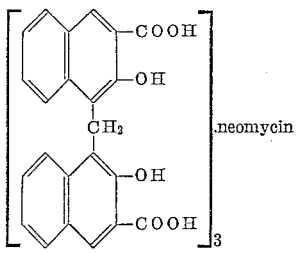

Neomycin pamoate is herein called for convenience a salt by analogy with salts such as neomycin sulphate although as will be understood it might be termed a complex between neomycin and pamoic acid.

Neomycin pamoate is a yellow crystalline solid melting, with decomposition, at about 240° C. when relatively pure. It contains about 39–40% by weight of neomycin and about 60–61% by weight of pamoic acid in accordance with the above-proposed formula. It is soluble in butylamine and diethylamine; slightly soluble in dimethylformamide and pyridine; and insoluble in water, alcohol, benzene, chloroform and acetone. It is in general insoluble in aqueous acids and soluble in aqueous alkalis.

The compound according to the invention can be prepared by any convenient salt-forming procedure. One method comprises treating a solution of pamoic acid (or a salt thereof) with a solution of neomycin (or a salt thereof). A particularly convenient method comprises treating an aqueous solution of a water-soluble salt of pamoic acid, preferably the sodium or potassium salt, with an aqueous solution of neomycin sulphate, advantageously at about ambient temperature. The proportions of the reactants are preferably selected to provide a molecular ratio of pamoic acid to neomycin of about 3:1. The neomycin pamoate precipitates from the reaction medium and can be separated therefore by filtration.

The antibiotic spectrum of neomycin pamoate does not differ substantially from the antibiotic spectrum of the known neomycin sulphate. This has been shown to be the case by tests carried out to compare the minimum inhibitory concentrations of the two salts against various bacterial and fungal organisms. The results are summarised in the following table:

TABLE 1
[The minimum inhibitory concentration (m.i.c.) expressed as neomycin base was determined after incubation at 37° C. for 24 hours]

| Strains | Neomycin sulphate (m.i.c.), µg./ml. | Neomycin pamoate (m.i.c.), µg./ml. |
|---|---|---|
| *Pseudomonas aeruginosa*, ATCC. 10 145 | 2.5 | 5 |
| *Escheri coli*, M. Leod ATCC. 10 536 | 1.25 | 1.25 |
| *Salmonella typhi*, M 507 T. 30 Roma | 10 | 10 |
| *Shigella flexneri*, D.E.A. | 0.31 | 0.31 |
| *Proteus vulgaris*, ATCC. 7829 | 10 | 10 |
| *Bacillus subtilis*, ATCC. 6633 | 1.25 | 1.25 |
| *Bacillus cereus*, I.S.M. | 1.25 | 0.31 |
| *Streptococcus haemolitycus*, C 203 Amer. | 0.62 | 0.62 |
| *Staphylococcus aureus*, ATCC. 6536 | 0.31 | 0.31 |
| *Candida albicans*, ATCC. 10 232 | 640 | 640 |
| *Saccaromyces cerevisae*, ATCC. 9763 | 160 | 160 |
| *Tricophyton mentagrophytes*, ATCC. 8757 | [1] 640 | [1] 320 |

[1] The minimum inhibitory concentration, with respect to *Tricophyton mentagrophytes*, was determined after incubation at 25° C. for 5 days.

The principal advantage of neomycin pamoate as compared with known acid-addition salts of neomycin such as neomycin sulphate lies in the fact that it is absorbed from the gastro-intestinal tract to a much smaller degree. As a result, the use of neomycin pamoate allows the maintenance, in loco, of higher concentrations of antibiotic for longer periods of time than with neomycin sulphate. Thus neomycin in the form of its pamoate salt has the characteristic of a long-acting antibiotic in the treatment of intestinal infections. Moreover, neomycin sulphate is known to possess hepatic and renal toxicities and also othotoxicity (all toxicities which must be regarded as related to its degree of absorption) while neomycin pamoate does not possess these toxicities to any significant degree.

The properties of neomycin pamoate have been demonstrated in pharmacological experiments carried out on rats. Thus, neomycin pamoate, when administered orally to rats, results in insignificant blood levels of neomycin which are very much below the blood levels of neomycin resulting from the use of comparable doses of neomycin sulphate. The blood levels are estimated by testing against *Staphylococcus aureus* in Petri-plates.

Furthermore, the elimination of neomycin pamoate via the urinary route, after oral administration to the rat, has been found to be about eight times less than the elimination of neomycin sulphate by the same route after administration of an equivalent dose. This is illustrated by the following table:

TABLE 2.—URINARY ELIMINATION IN THE RAT FROM 0 TO 24 HOURS OF NEOMYCIN PAMOATE AND NEOMYCIN SULPHATE AFTER ORAL ADMINISTRATION AT DOSES EQUIVALENT TO 500 MG./KG. OF NEOMYCIN BASE

| Neomycin sulphate eliminated from 0 to 24 hours, percent | Neomycin pamoate eliminated from 0 to 24 hours, percent |
|---|---|
| $\overline{M}$±standard err. 2.75±0.31 | $\overline{M}$±standard err. 0.33±0.044 |
| P<0.001 (calculated by the "*t*" Student method) ||

The $LD_{50}$ of neomycin pamoate, administered orally to rats and mice, is greater than 5,000 mg./kg. Moreover, when the compound is administered orally to young rats for a period of one month at a daily dose corresponding to 50 mg./kg. of neomycin base, no toxic effect on body growth, hematic crasis or the main histologically studied organs is observed.

Tests to assess the hepatic functionally (determination of the serum levels of the glutamic-pyruvic transaminase (GPT) according to Wroblewsky, F., and La Due, J. S., J. Med. Lab. Technol. 15, 17, 1958) carried out in the rat by oral administration of the compound at dosage levels corresponding to 20 mg./kg./day of neomycin base for a period of one month, have shown that there is no significant difference between the hepatic functionality of the animals treated with neomycin pamoate and that of controls.

Tests to assess the renal functionality (carried out according to Erspamer, V. and Ottolenghi, A., Arch. Int. Pharmacodyn. XCIII No. 2, 178, 1953) carried out on the rat by oral administration at dosage levels corresponding to 20 mg./kg./day of neomycin base for a period of one month, show that there is no significant difference between the renal functionality of the animals treated with neomycin pamoate and that of controls.

Further according to the invention, there is provided pharmaceutical compositions which comprise neomycin pamoate as active ingredient together with a pharmaceutical carrier or excipient. The compositions are advantageously in a form suitable for oral administration, and may be in solid or liquid form. Suitable liquid forms include drops and suspensions, the liquid carrier including, for example water together with sweetening, flavouring, thickening, dispersing and/or other agents.

The compositions are preferably formulated as dosage units, each dosage unit being adapted to supply a single dose of the active ingredient. Each dosage unit preferably contains from 0.02 to 1 g., and advantageously from 0.05 to 0.2 g., of neomycin pamoate. Suitable dosage unit forms include tablets, coated tablets, pills, capsules and cachets.

Where the compositions are in solid forms suitable solid carriers include lactose, starches (particularly corn, maize and soluble starches), magnesium stearate and talc.

The compositions may if desired contain, in addition to the neomycin pamoate, one or more further pharmacologically active ingredients such as, for example, intestinal sulphonamides and other compounds useful in the treatment of intestinal infections such as aluminum pamoate. The compositions may also if desired contain an absorbent.

In order that the invention may be well understood we give the following examples by way of illustration only:

*Example 1*

A solution of 260 g. (0.6 mole) of sodium pamoate in 6.1 of water is added slowly with stirring at room temperature to a solution of 233.45 g. (0.2 mole) of neomycin sulphate in 4.5 l. of water. A pale yellow precipitate is formed immediately which is filtered, washed with water and dried under vacuum.

Yield: 384 g. of neomycin pamoate.

*Analysis.*—Found—C, 60.92; H, 5.49; N, 5.11. Neomycin content: Found—C, 39.3. Pamoic acid content: Found—62.7.

*Example 2*

Tablets: doses for 1000 units—

| | G. |
|---|---|
| Neomycin pamoate | 100 |
| Starch | 200 |
| Lactose | 40 |
| Magnesium stearate | 10 |

*Preparation.*—The active compound, the excipients and one half of the magnesium stearate are intimately mixed and compressed into slugs which are then granulated. The remaining magnesium stearate is added to the granulated mixture which is then compressed into tablets weighing 0.35 g.

Each tablet contains 0.1 g. of active compound.

*Example 3*

Tablets: doses for 1000 units—

| | G. |
|---|---|
| Neomycin pamoate | 75 |
| Aluminum pamoate | 75 |
| Starch | 150 |
| Lactose | 40 |
| Magnesium stearate | 10 |

*Preparation.*—The same technique as described in the previous example is adopted.

Each tablet, weighing 0.35 g., contains 0.075 g. of neomycin pamoate.

*Example 4*

Capsules: doses for 1000 units—

| | G. |
|---|---|
| Neomycin pamoate | 100 |
| Starch | 90 |
| Magnesium stearate | 10 |

*Preparation.*—The components are intimately mixed; the capsules of hard gelatine are then each filled with 0.200 g. of the mixture.

Each capsule contains 0.1 g. of active substance.

*Example 5*

Capsules: doses for 1000 units—

| | G. |
|---|---|
| Neomycin pamoate | 75 |
| Aluminum pamoate | 75 |
| Starch | 40 |
| Magnesium stearate | 10 |

*Preparation.*—The same technique as described in the previous example is adopted.

Each capsule contains 0.075 g. of neomycin pamoate.

*Example 6*

Cachets: doses for 1000 units—

| | G. |
|---|---|
| Neomycin pamoate | 100 |
| Starch | 200 |
| Lactose | 40 |
| Magnesium stearate | 10 |

*Preparation.*—The ingredients are intimately mixed; the containers are filled with 0.35 g. of the mixture thereby obtained.

Each cachet contains 0.1 g. of active substance.

*Example 7*

Cachets: doses for 1000 units—

| | G. |
|---|---|
| Neomycin pamoate | 75 |
| Aluminum pamoate | 75 |
| Starch | 150 |
| Lactose | 40 |
| Magnesium stearate | 10 |

*Preparation.*—The same technique as described in the previous example is adopted.

Each cachet contains 0.075 g. of neomycin pamoate.

*Example 8*

Extemporary suspension: doses for 100 ml. of suspension—

| | G. |
|---|---|
| Neomycin pamoate | 2 |
| Mannitol | 5 |
| Polyoxyethylene sorbitan monooleate | 0.1 |
| Pectin | 0.5 |
| Flavouring and colouring agents | Q.s. |

*Preparation.*—The ingredients are intimately mixed and placed into a 100 ml. flask having a wide mouth. Before use, the flask is filled with water to provide 100 ml. of suspension, which is well stirred before use.

5 ml. of suspension contain 0.1 g. of active substance.

Example 9

Extemporary suspension: doses for 100 ml. of suspension—

| | G. |
|---|---|
| Neomycin pamoate | 1.5 |
| Aluminum pamoate | 1.5 |
| Mannitol | 7 |
| Pectin | 0.5 |
| Polyoxyethylene sorbitan monooleate | 0.5 |
| Flavouring and colouring agents | Q.s. |

*Preparation.*—The same technique as described in the previous example is adopted.

5 ml. of suspension contain 0.075 g. of neomycin pamoate.

The aluminum pamoate referred to in the above examples is described in my U.S. Patent No. 3,223,720 which issued on Dec. 14, 1965.

I claim:
Neomycin pamoate.

References Cited by the Examiner
UNITED STATES PATENTS

| | | | |
|---|---|---|---|
| 3,013,007 | 12/1962 | Dale | 260—210 |
| 3,022,286 | 2/1962 | Van de Griendt | 260—210 |

ELBERT L. ROBERTS, *Primary Examiner.*

JOHNNIE R. BROWN, *Assistant Examiner.*